(12) United States Patent
Liu et al.

(10) Patent No.: US 10,019,478 B2
(45) Date of Patent: Jul. 10, 2018

(54) MECHANISM FOR OPTIMIZING PARALLEL EXECUTION OF QUERIES ON SYMMETRIC RESOURCES

(71) Applicant: Futurewei Technologies, Inc., Plano, TX (US)

(72) Inventors: Yanchen Liu, San Jose, CA (US); Masood Mortazavi, Santa Clara, CA (US); Mengmeng Chen, San Jose, CA (US); Fang Cao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 579 days.

(21) Appl. No.: 14/477,296

(22) Filed: Sep. 4, 2014

(65) Prior Publication Data

US 2015/0066972 A1   Mar. 5, 2015

Related U.S. Application Data

(60) Provisional application No. 61/874,027, filed on Sep. 5, 2013.

(51) Int. Cl.
*G06F 17/30* (2006.01)

(52) U.S. Cl.
CPC .. *G06F 17/30442* (2013.01); *G06F 17/30469* (2013.01); *G06F 17/30306* (2013.01); *G06F 17/30433* (2013.01); *G06F 17/30474* (2013.01)

(58) Field of Classification Search
CPC ......... G06F 17/30469; G06F 17/30433; G06F 17/30306; G06F 17/30474

(Continued)

(56) References Cited

U.S. PATENT DOCUMENTS

| | | |
|---|---|---|
| 5,574,900 A | 11/1996 | Huang et al. |
| 5,694,591 A | 12/1997 | Du et al. |

(Continued)

FOREIGN PATENT DOCUMENTS

| | | |
|---|---|---|
| CN | 101295315 A | 10/2008 |
| CN | 102436494 A | 5/2012 |

OTHER PUBLICATIONS

Foreign Communication From A Counterpart Application, PCT Application No. PCT/US2014/054286, International Report dated Dec. 11, 2014, 5 pages.

(Continued)

*Primary Examiner* — Frantz Coby
(74) *Attorney, Agent, or Firm* — Conley Rose, P.C.

(57) ABSTRACT

A method that comprises receiving a logical execution plan for a database query corresponding to a plurality of tables of the database, wherein the logical execution plan comprises one or more operators, receiving an operator cost for each of the operators in the logical execution plan, computing a first accumulated processing cost for a first of the tables based on the logical execution plan, operator selectivity, and operator costs corresponding to the first table, computing a second accumulated processing cost for a second of the tables based on the logical execution plan, operator selectivity, and operator costs corresponding to the second table, comparing the first accumulated processing cost and the second accumulated processing cost to determine a table with the highest accumulated processing cost, and responsive to comparing the accumulated processing costs, computing a physical execution plan that requires partitioning the table with the highest accumulated processing cost.

20 Claims, 11 Drawing Sheets

(58) Field of Classification Search
USPC .................................. 707/713, 719, 737, 600
See application file for complete search history.

(56) References Cited

U.S. PATENT DOCUMENTS

| | | | | |
|---|---|---|---|---|
| 5,864,840 | A * | 1/1999 | Leung | G06F 17/30451 |
| 6,092,062 | A * | 7/2000 | Lohman | G06F 17/30463 |
| 6,275,818 | B1 * | 8/2001 | Subramanian | G06F 17/3046 |
| 6,505,187 | B1 * | 1/2003 | Shatdal | G06F 17/30486 |
| | | | | 707/737 |
| 7,689,538 | B2 * | 3/2010 | Li | G06F 17/30457 |
| | | | | 707/999.002 |
| 7,747,449 | B2 * | 6/2010 | Lober | G06F 11/3447 |
| | | | | 705/1.1 |
| 7,984,043 | B1 | 7/2011 | Waas | |
| 7,987,178 | B2 * | 7/2011 | Hueske | G06F 17/30306 |
| | | | | 707/713 |
| 8,051,422 | B2 * | 11/2011 | Narita | G06F 9/5038 |
| | | | | 707/600 |
| 8,126,870 | B2 | 2/2012 | Chowdhuri et al. | |
| 8,775,414 | B2 * | 7/2014 | Birdsall | G06F 17/30466 |
| | | | | 706/12 |
| 8,930,344 | B2 * | 1/2015 | Kakarlamudi | 707/713 |
| 9,128,984 | B2 * | 9/2015 | Wiener | G06F 17/30474 |
| 9,229,983 | B2 * | 1/2016 | Yu | G06F 17/30469 |
| 9,424,310 | B2 * | 8/2016 | Birdsall | G06F 17/30466 |
| 2004/0122845 | A1 | 6/2004 | Lohman et al. | |
| 2006/0218123 | A1 | 9/2006 | Chowdhuri et al. | |
| 2008/0195578 | A1 * | 8/2008 | Hueske | G06F 17/30463 |
| 2008/0270371 | A1 | 10/2008 | Fiebig | |
| 2012/0047158 | A1 * | 2/2012 | Lee | G06F 17/30469 |
| | | | | 707/759 |
| 2012/0066250 | A1 | 3/2012 | Toub et al. | |
| 2012/0179669 | A1 * | 7/2012 | Al-Omari | G06F 17/30433 |
| | | | | 707/719 |

OTHER PUBLICATIONS

Foreign Communication From A Counterpart Application, PCT Application No. PCT/US2014/054286, Written Opinion dated Dec. 11, 2014, 8 pages.

Machine Translation and Abstract of Chinese Publication No. CN102436494, May 2, 2012, 14 pages.

Foreign Communication From a Counterpart Application, Chinese Application No. 201480049318.7, Chinese Office Action dated May 18, 2018, 6 pages.

Foreign Communication From a Counterpart Application, Chinese Application No. 201480049318.7, Chinese Search Report dated May 10, 2018, 2 pages.

* cited by examiner

MECHANISM FOR OPTIMIZING PARALLEL EXECUTION OF QUERIES ON SYMMETRIC RESOURCES

CROSS-REFERENCE TO RELATED APPLICATIONS

The present application claims priority to U.S. Provisional Patent Application 61/874,027, filed on Sep. 5, 2013 by Yanchen Liu et al., and entitled "Mechanism for Optimizing Parallel Execution of Queries on Symmetric Resources," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Database sizes are growing exponentially and as a result, column-oriented relational databases are being considered as a way to improve the query speed of large data sets, which may also be referred to as catalogues. The rapid development of multi-core central processing units (CPUs) may provide opportunities to further reduce execution time of queries. Improving the parallelism usage of CPUs with large data sets becomes an important issue for column-oriented relational database to speed up the queries. Piece partition strategy may be an efficient means to divide tables of column based databases into numbers of pieces so that multi-core CPUs can work in parallel on these pieces. A piece partition strategy may maximize the utilization of multi-CPU resources.

SUMMARY

In one embodiment, the disclosure includes a method that comprises receiving a logical execution plan for a database query corresponding to a plurality of tables of the database, wherein the logical execution plan comprises one or more operators, receiving an operator cost for each of the operators in the logical execution plan, computing a first accumulated processing cost for a first of the tables based on the logical execution plan and operator costs corresponding to the first table, computing a second accumulated processing cost for a second of the tables based on the logical execution plan and operator costs corresponding to the second table, comparing the first accumulated processing cost and the second accumulated processing cost to determine a table with the highest accumulated processing cost, and responsive to comparing the accumulated processing costs, computing a physical execution plan that requires partitioning the table with the highest accumulated processing cost.

In another embodiment, the disclosure includes a method that comprises receiving instructions for querying data in a database comprising a plurality of tables, receiving an accumulated operator selectivity related to a first table by execution of the instructions, computing a first accumulated processing cost for the first table based on the operator selectivity of the first table, receiving an accumulated operator selectivity related to a second table by execution of the instructions, computing a second accumulated processing cost for the second table based on the operator selectivity of the second table, comparing the first accumulated processing cost and the second accumulated processing cost, and selecting a table for partitioning in response to the comparison such that the table selected for partitioning has a highest accumulated processing cost.

In yet another embodiment, the disclosure includes an apparatus that comprises a port configured to receive a query tree associated with a query to be performed on a plurality of database tables by a plurality of threads, a number of records stored in each table, a plurality of operator costs, each corresponding to an operator identified by the query tree and one of the tables, and a plurality of accumulated effective selectivity values, each corresponding to one of the operators identified by the query tree and one of the tables, and a processor coupled to the port and configured to compute an accumulated processing cost for each table comprising a product of a number of records stored in the table multiplied by a sum of the operator costs corresponding with the table and multiplied by the accumulated effective selectivity value corresponding to the table, and compute a query execution plan for the query in response to the comparison that comprises instructions for partitioning one of the database tables with a highest accumulated processing cost.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Alternative piece partitioning approaches may also speed up multi-table based queries. Methods, such as those employed in MonetDB, may choose the largest table to partition. Alternative methods may choose the table which is the first related table to perform a join operation in the operator tree. However, by using the benchmark of Transaction Processing Performance Council benchmark H (TPC-H) against 100 gigabytes (GB) of data for confirmation, a cost-based piece partitioning (CBPP) optimizer for multi-operation based queries with multi-table, as will be disclosed herein, may provide improved performance when compared to conventional methods.

Disclosed herein is a procedure that may enable parallel utilization of symmetric computing resources (e.g., multiple threads and/or multiple cores) for data queries in relational databases. The present disclosure may enable the utilization of multithread capabilities of multi-core CPUs performing data queries on database tables through the use of cost-based piece partitioning. The partitioning may be based on an accumulated processing cost or on other methods of determining computational costs. The accumulated processing cost may be determined according to a number of rows in a table being evaluated, operator processing costs for operators involved in operations that are to be performed on the table, and/or accumulated operator selectivity values for the table. In some embodiments the partitioning may be performed on a single table having the greatest accumulated processing cost. In other embodiments, the partitioning may be performed on a plurality of tables according to cost differentials between a plurality of tables in the database.

Figure 1:
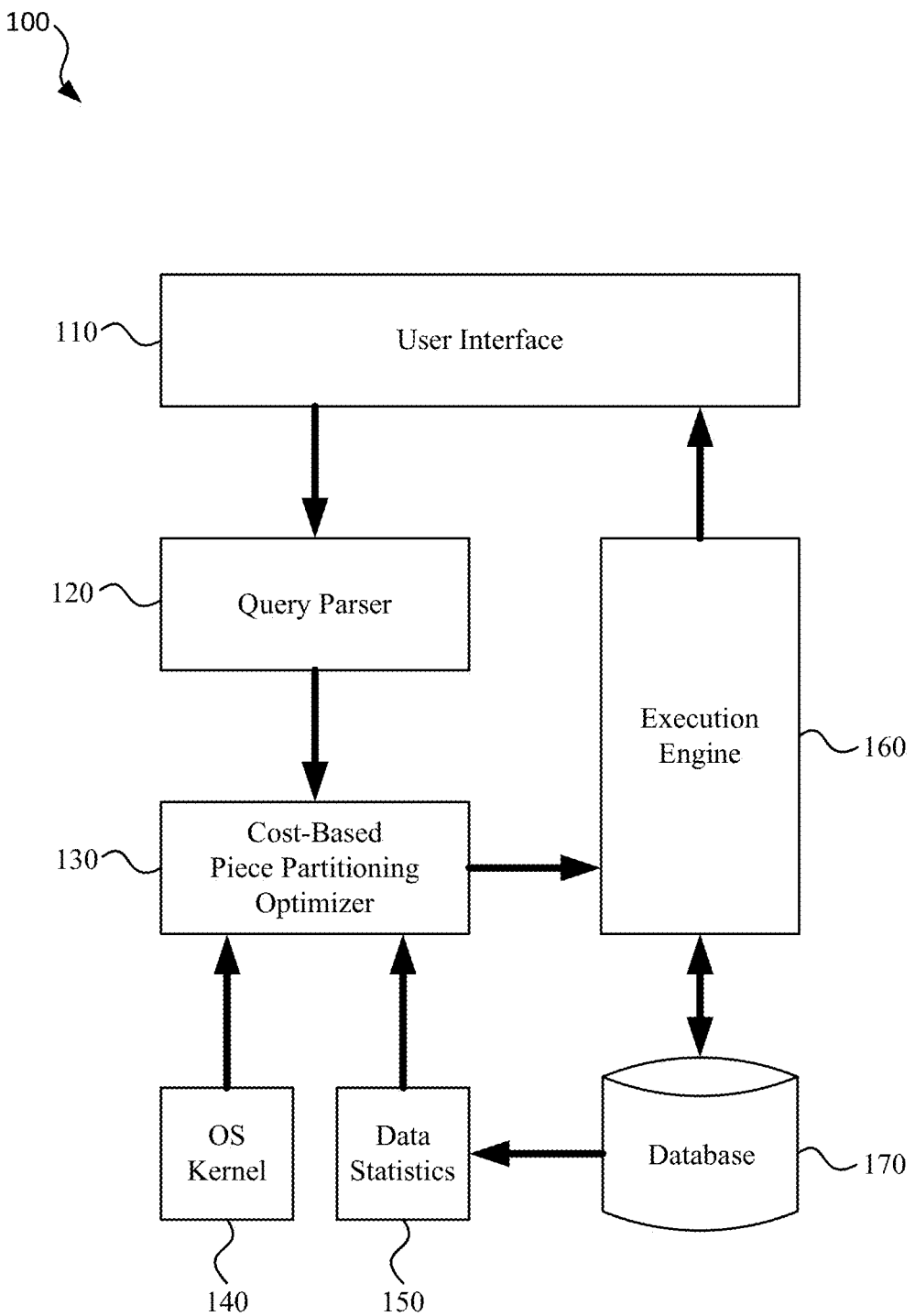
FIG. 1 is a schematic diagram of an embodiment of a database query architecture.

FIG. 1 is a schematic diagram of an embodiment of a database query architecture 100. Architecture 100 may be employed for data queries of relational databases to take advantage of existing multithreaded capabilities of multi-core CPUs and/or any other symmetric set of computational resources that have access to the same data set as would be appreciated by one of ordinary skill in the art upon viewing this disclosure. User interface 110 may receive one or more search terms (e.g., a search string) from a user who wishes to search a database 170. The search terms may tell the query parser 120 what information is sought by the user. After being received, the search terms may be passed from the user interface 110 to a query parser 120. At query parser 120, the search terms may be translated into a plurality of operators organized into a series of ordered steps and/or specific instructions for searching the database 170. In certain embodiments, the ordered steps and/or specific instructions may be referred to as a chain of operations, a logical operation plan, a logical execution plan, a query tree, or any other name by which one of ordinary skill in the art would recognize the ordered steps and/or specific instructions as being the result of query parsing for database searching.

The logical execution plan output by query parser 120 may be transmitted to a CBPP optimizer 130. The logical execution plan may tell the CBPP optimizer 130 what steps may be taken to obtain the information that is sought by the user. The CBPP optimizer 130 may use input received from Operating System (OS) kernel 140, data statistics 150, and query parser 120 to determine a processing cost for each table being searched in database 170. The processing cost may be a calculation of the CPU resources that would be necessary to execute the logical operation plan for each table in the database. Specifically, the processing cost calculated for each table in database 170 may be an accumulated processing cost, e.g., the processing cost may account for each operator present in the series of ordered steps for searching database 170. For example, CBPP optimizer 130 may receive a logical operation plan from query parser 120, receive operator factors from OS kernel 140 that correspond to each operator in the logical operation plan, receive a number of records in the table for which a processing cost is currently being determined from data statistics 150, and receive an operator selectivity or accumulated effective selectivity from data statistics 150. The term accumulated effective selectivity is generally used herein to refer to a selectivity through an operator chain which may accumulate multiplicatively to produce an effective overall selectivity for the whole chain. Once received, the inputs to CBPP optimizer 130 may be evaluated according to an accumulated processing cost calculation described below to determine a processing cost for each table in database 170. The calculated accumulated processing cost for each table may then be compared to determine a table having the highest accumulated processing cost. According to the result of the comparison, CBPP optimizer 130 may determine a physical execution plan for searching database 170 that comprises a plan for partitioning the table determined to have the highest accumulated partitioning cost. In some embodiments, determining the physical execution plan may include partitioning the table having the highest accumulated process cost in database 170 according to the result of the comparison.

The table may be partitioned according to any suitable partitioning scheme including, for example, piece-partitioning. The table may be partitioned into a plurality of pieces according to the resources available in a CPU. For example, the table may be partitioned into a number of pieces that corresponds to the number of processing threads available in the CPU. As another example, the table may be partitioned into a number of pieces that corresponds to the number of processing cores available in the CPU. Alternatively, the table may be partitioned into any number of pieces that corresponds to the number of symmetric resources available in the CPU. The table may be partitioned so that execution of the related operators for the table may be performed in parallel. Performing the operations in parallel may permit searching database 170 at an increased speed when compared to a search in which operations are not performed in parallel.

In some embodiments of architecture 100, the physical execution plan, via CBPP optimizer 130, may further identify tables with a large accumulated processing cost that do not have the highest accumulated processing. The additional tables identified by the physical execution plan may be partitioned into a plurality of pieces, but fewer pieces than the number of pieces into which the table having the highest accumulated processing cost is partitioned. The number of pieces into which the additional tables may be partitioned may be determined according to processing cost differentials between the table with the highest accumulated processing cost and the additional tables that have a large accumulated processing cost but do not have the highest accumulated processing cost. For example, the processing cost differential may be adjusted with a weighing factor that can capture the effect of the processing operator that is the target user of the piece partitioning. Additionally, the weighing factor may be adjusted through reinforcement learning across all queries involving the particular operator. As such, the weighing factor may be adjusted during run-time. Partitioning of the additional tables may, in some embodiments, be referred to as asymmetric piece-partitioning. The additional tables may be partitioned in some embodiments by CBPP optimizer 130, or in other embodiments, by execution engine 160.

The physical execution plan determined by CBPP optimizer 130 may be transmitted to execution engine 160 for execution. The physical execution plan may instruct execution engine 160 how to perform the steps that may be taken to obtain the information sought by the user. Database 170 may be stored locally, e.g., on the same physical device as architecture 100, or alternatively, database 170 may be stored remotely, e.g., on a device accessible via a network and/or other data connection. Execution engine 160 may perform a search of database 170, e.g., evaluating the tables and/or partitioned tables in database 170 according to the operators in the physical execution plan. In some in which CBPP optimizer 130 does not partition the table having the highest accumulated processing cost when executing the physical execution plan, execution engine 160 may partition the table having a highest accumulated processing cost in database 170 according to the plan for partitioning determined by the CBPP optimizer 130. After the table with the highest accumulated processing cost is partitioned, execution engine 160 may continue performing the search of database 170 by evaluating the tables and/or partitioned tables in database 170 according to the operators in the physical execution plan. Once execution engine 160 has completed the search of database 170, search results may be transmitted to user interface 110 for delivery to the user.

A cost model may provide an ordering among possible query execution plans and/or optimization alternatives based on the size of tables, sub-query selectivity, and type of query operator. An accumulated processing cost (accu_cost$_i$) may be calculated for a table (e.g., a table in database 170, shown in FIG. 1) before the last operation in an execution plan that can benefit from piece partitioning. The accumulated processing cost of the i-th table in a relational database may be calculated for a particular plan and may be accumulated (e.g., summed or integrated) over a chain of operators in the plan. The accumulated processing cost may be calculated according to:

$$\text{accu\_cost}_i = Num_i * \sum_{j=1}^{N} Op_j * \left( \prod_{k=1}^{j} S_{k-1} \right),$$

where the number of records of the i-th table is shown as $Num_i$, N represents the number of operators in the chain of operations involving the i-th table (e.g., the table before the last operation which will benefit from piece partitioning), $Op_j$ represents the operator factor which may vary depending on the execution cost of the given operator, and the expression $\Pi_{k=1}^{j} S_{k-1}$ is the accumulated effective selectivity, ranging from about 0.0 to about 1.0, up to the operator j. While all operations may benefit, operators may be selected based on which may benefit most, for example, operators involving joins of largest tables. In one embodiment, the $S_0$ term corresponding to the accumulated effective selectivity for the first operator in a chain of operations may be a predetermined value equaling 1.

Figure 2:
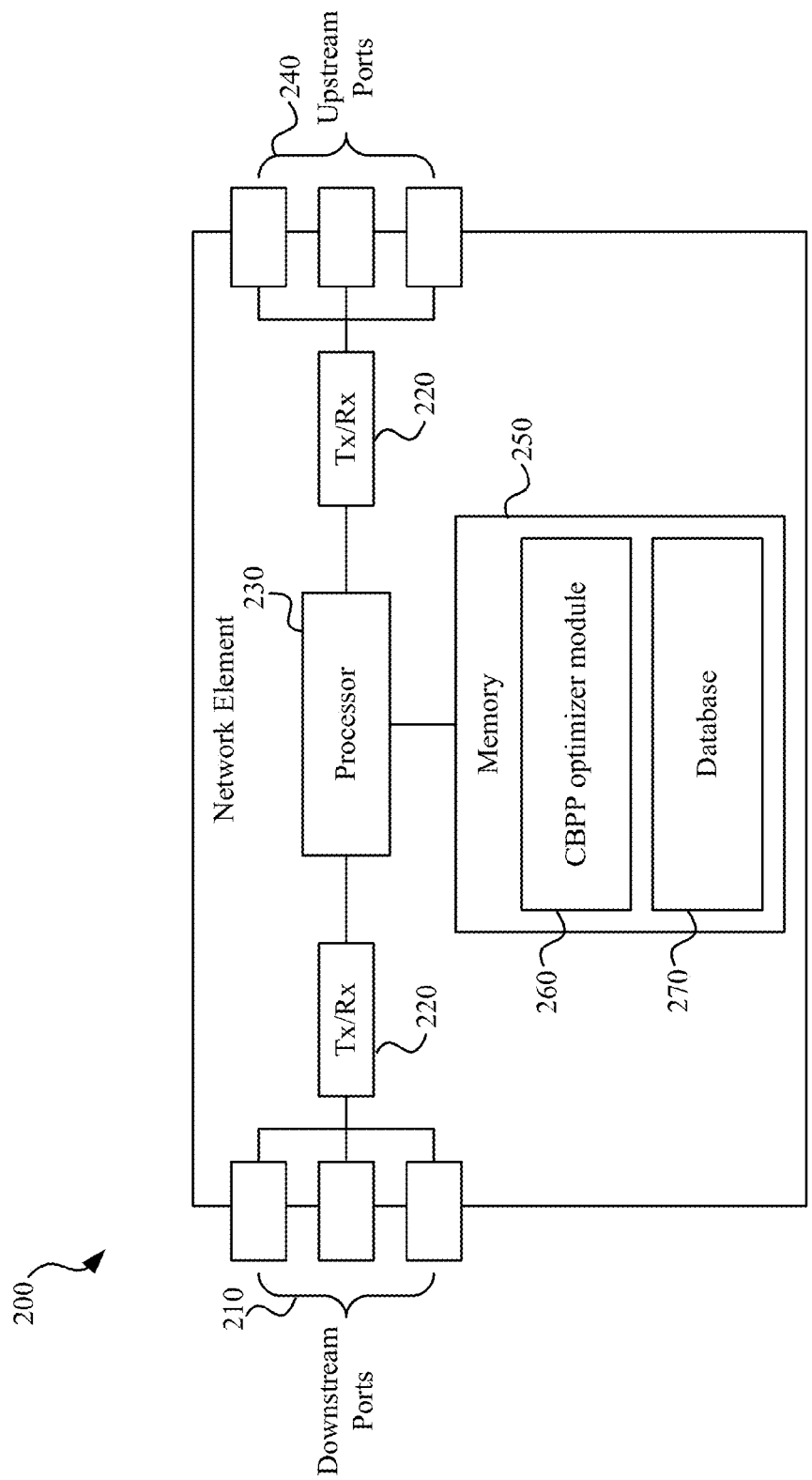
FIG. 2 is a schematic diagram of an embodiment of a network element.

At least some of the features/methods described in this disclosure may be implemented in a network element 200. For instance, the features/methods of this disclosure may be implemented using hardware, firmware, and/or software installed to run on hardware. The network element 200 may be any device that transports data through a network, system, and/or domain e.g., an access point, an access point station, a router, a switch, a gateway, a bridge, a server, a client, a user-equipment, a mobile communications device, etc. The network element may further be any device that facilitates user interaction with and/or searching of a database, such as a personal digital assistant (PDA), a tablet, a smartphone, a laptop computer, a desktop computer, etc. FIG. 2 is a schematic diagram of an embodiment of a network element 200 that may be used to implement architecture 100, shown in FIG. 1. Moreover, the terms network element, network node, network component, network module, and/or similar terms may be interchangeably used to generally describe a network device and do not have a particular or special meaning unless otherwise specifically stated and/or claimed within the disclosure. In one embodiment, network element 200 may be an apparatus configured to facilitate user querying of a database. The database may be stored locally on network element 200, or the database may be stored remotely and accessed by network element 200 over a network. For example, some or all of architecture 100, shown in FIG. 1, may be implemented in network element 200. Specifically, network element 200 may implement a user interface 110, query parser 120, CBPP optimizer 130, OS kernel 140, data statistics 150, execution engine 160, and/or database 170.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another embodiment, the network element 200 may comprise one or more antennas coupled to the Tx/Rx 220. The Tx/Rx 220 may transmit and/or receive data (e.g., packets) from other network elements via wired and/or wireless connections.

A processor 230 may be coupled to the Tx/Rx 220 and may be configured to process the frames and/or determine to which nodes to send (e.g., transmit) the packets. Processor 230 may be further configured to calculate processing costs for searching tables in a database, determine a physical execution plan for searching the tables in the database, partition tables in the database, and/or execute a plan to search tables in the database to obtain a result. In an embodiment, the processor 230 may comprise one or more multi-core processors and/or memory modules 250, which may function as data stores, buffers, databases, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors, multiple cores, multiple threads, etc.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solidstate drives (SSDs), and/or tape drives and is used for non-volatile storage of data and as an over-flow storage device if the RAM is not large enough to hold all working data. The secondary storage may be used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the database tables and/or instructions for carrying out the various embodiments described herein. In one embodiment, the memory module 250 may comprise a CBPP optimizer module 260 which may be implemented on the processor 230. In another embodiment, CBPP optimizer module 260 may be implemented by hardware and/or firmware in processor 230. In one embodiment, the CBPP optimizer module 260 may be implemented to facilitate calculation of processing costs for searching tables in a database and/or partitioning tables in the database, as well as implement methods of determining processing costs such as methods 500 and/or 600 shown below in FIG. 5 and FIG. 6 respectively. The CBPP optimizer module 260 may determine processing costs for and/or partition tables in a database 270 at the memory module 250. Database 270 may be substantially similar to database 170, shown in FIG. 1. The CBPP optimizer module 260 may determine the processing costs for tables according to information obtained from database 270, such as, operator selectivity, a number of rows in the tables, etc. The CBPP optimizer module 260 and database 270 may be implemented using software, hardware, or both. The CBPP optimizer module 260 may be employed to perform a processing cost determine 300, develop physical execution plan 400 and partitioning plan 700, perform methods 500 and 600, as discussed below, based on the contents of database 270.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
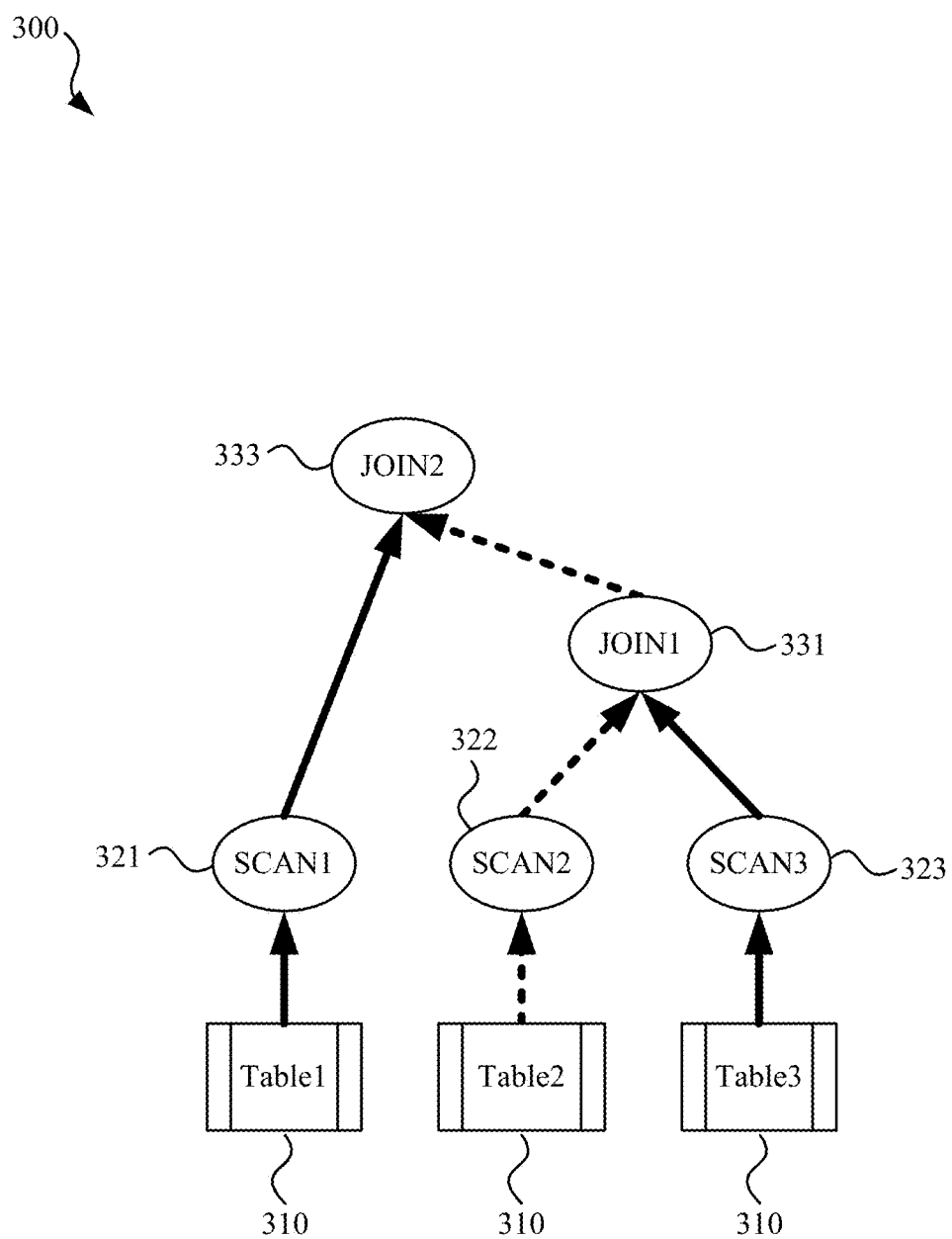
FIG. 3 is a schematic view of an embodiment of processing cost determination.

FIG. 3 is a schematic view of an embodiment of a processing cost determination 300. A CBPP optimizer, such as CBPP optimizer 130 and/or CBPP optimizer module 260, may receive a logical execution plan from a query parser. The logical execution plan may contain operators that tell the CBPP optimizer what steps may be taken to obtain information sought by a user, such as SCAN1 321, SCAN2 322, SCAN3 323, JOIN1 331, JOIN2 333, etc. The CBPP optimizer may calculate an accumulated processing cost for each table 310 reference in the logical operation plan according to the above cost model. Tables 310 may be stored in a database such as database 170 and/or 270. After calculating the accumulated processing cost for each table 310, the CBPP optimizer may compare the accumulated processing cost of each table 310 to determine a table 310 with the highest accumulated processing cost. For example, in FIG. 3 the CBPP optimizer has calculated Table 2 310 as the table having the highest accumulated processing cost (the path corresponding to the highest accumulated processing cost is noted with dashed lines). After determining that Table 2 310 has the highest accumulated processing cost, the CBPP optimizer may partition Table 2 310 according to the piece-partitioning scheme disclosed above. The partitioning may be performed prior to execution of the first operator (e.g., SCAN2 322) that might benefit from partitioning Table 2 310. For example, if the accumulated processing cost of Table 2 310 is larger than the accumulated processing cost of Table 3 310 before JOIN1 331 and the accumulated processing cost of Table 1 310 before JOIN2 333, the CBPP optimizer may partition Table 2 310 before SCAN2 322. After partitioning Table 2 310, the CBPP optimizer may determine a physical execution plan, such as the physical execution plan shown below in FIG. 4, for searching the database with piece-partitioned tables. The physical execution plan may be transmitted to an execution engine, such as execution engine 160, for execution of the physical execution plan and to obtain a search result.

Figure 4:
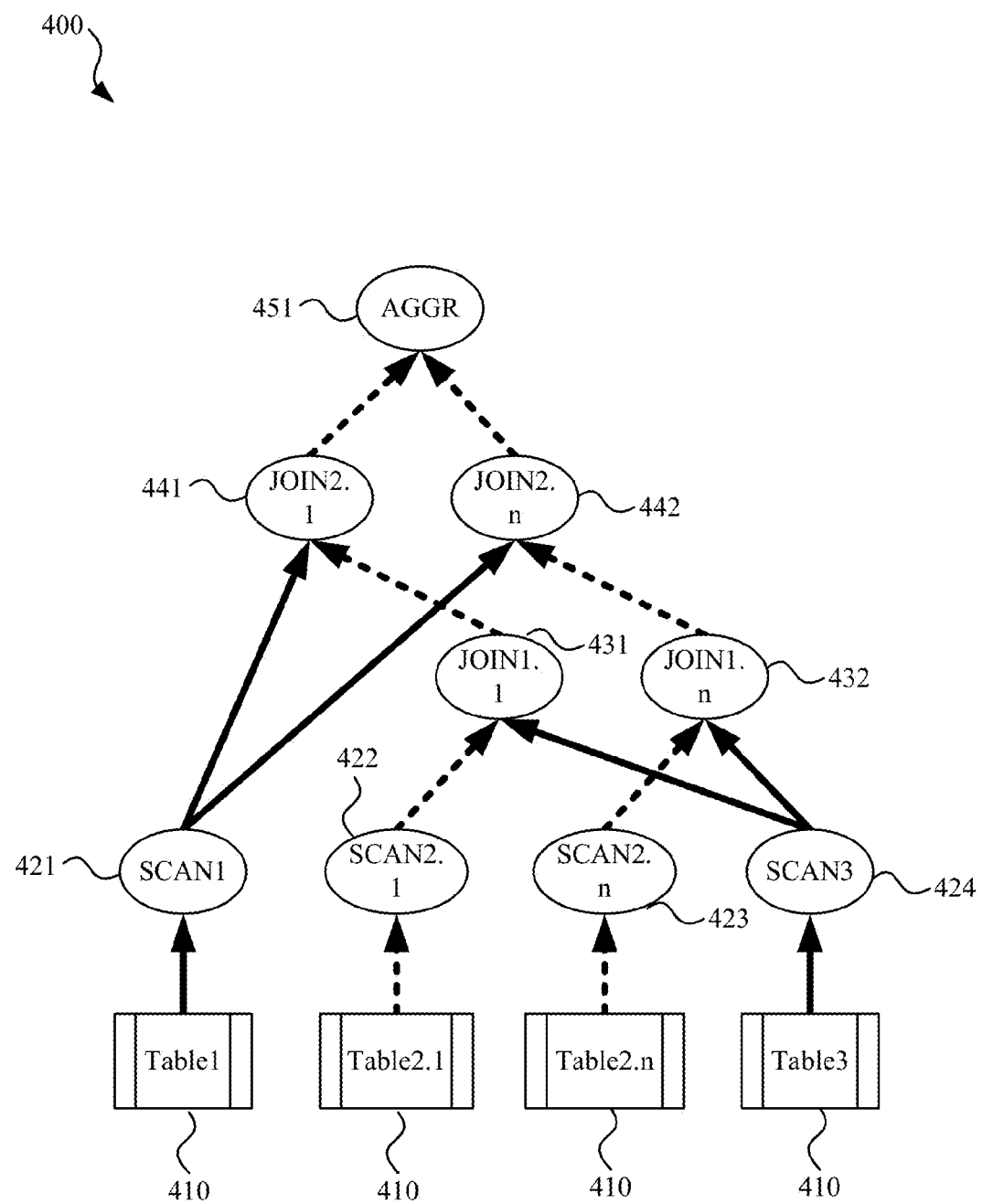
FIG. 4 is a schematic view of an embodiment of a physical execution plan for searching a database.

FIG. 4 is a schematic view of an embodiment of a physical execution plan 400 for searching a database. The physical execution plan 400 may be determined by a CBPP optimizer, such as CBPP optimizer 130 and/or CBPP optimizer module 260, from a logical execution plan received from a query parser. The logical execution plan may describe what information is desired, and the physical execution plan 400 may describe steps that may be taken to obtain the information that the logical execution plan indicated is desired. The physical execution plan 400 may facilitate the use of a plurality of cores and/or threads in a CPU to execute operators of the physical execution plan 400 in parallel on a table 410 (e.g., a Table 2 (not shown)) that has been divided into a plurality of partitioned parts (e.g., Table 2.1 410, ..., Table 2.n 410), which may be stored in a database such as database 170 and/or 270. For example, in FIG. 4 the SCAN2.1 422 and SCAN2.n 423, JOIN1.1 431 and JOIN1.n 432, and JOIN2.1 441 and JOIN2.n 442 operators may be executed in parallel prior to execution of an aggregate (AGGR) 451 operator that aggregates the results from operations involving the partitioned parts of Table 2. Executing the operators in parallel may result in a reduced amount of idle CPU resources and an increased operator execution time for a given physical execution plan. As discussed above, in some embodiments the number of partitioned parts of the table 410 may be about equal to a number of symmetric processing resources (e.g., cores, threads, etc.) available in the CPU. For example, Table 2 may be partitioned into n parts (Table 2.1 410, ..., Table 2.n 410) when the CPU has n suitable symmetric processing resources as would be appreciated by one of ordinary skill in the art upon viewing this disclosure.

Figure 5:
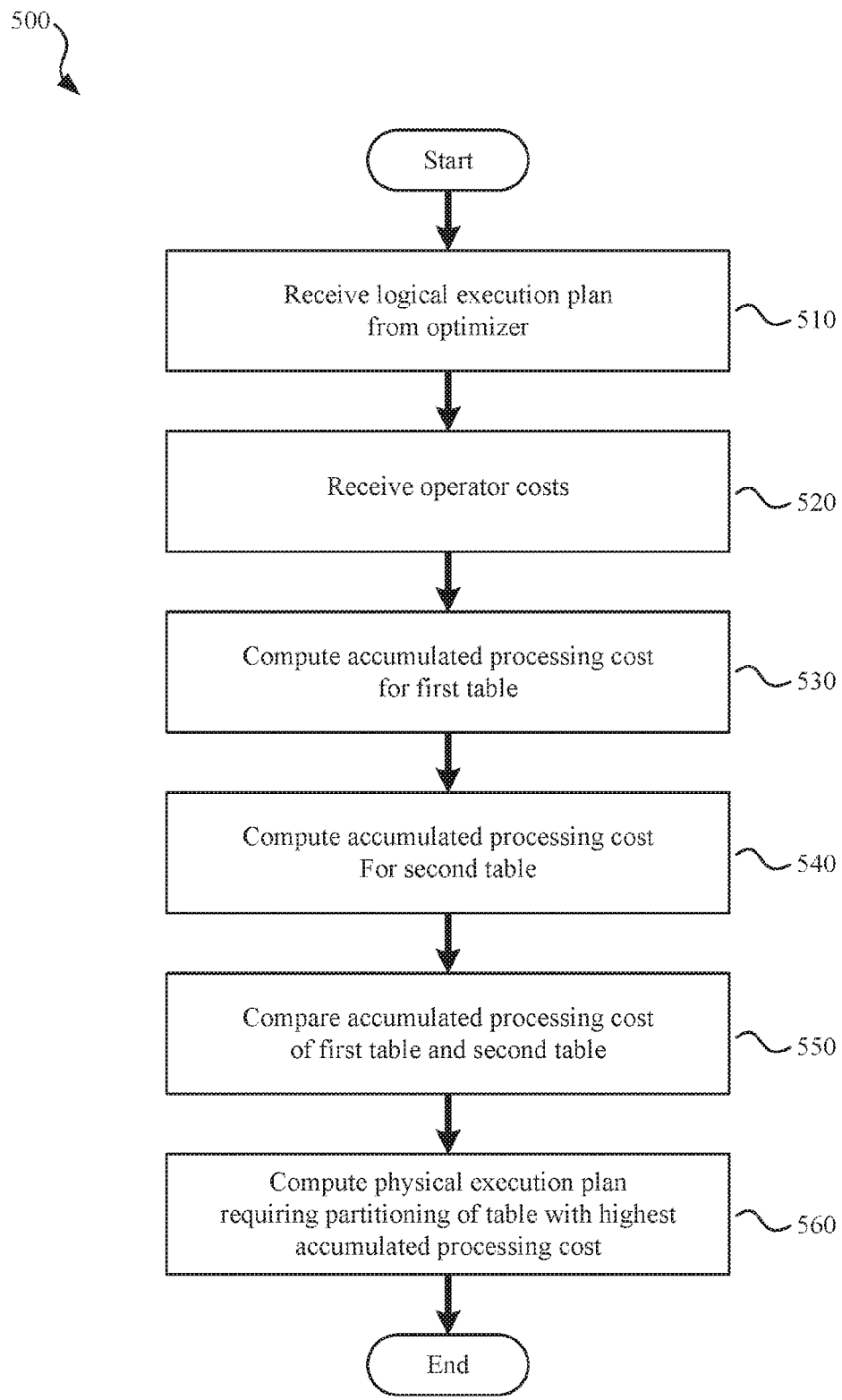
FIG. 5 is a flowchart of an embodiment of a method for cost-based piece-partitioning in a database.

FIG. 5 is a flowchart of an embodiment of a method 500 for cost-based piece-partitioning in a database, which may be performed by a CBPP optimizer, such as CBPP optimizer 130 and/or CBPP optimizer module 260. Method 500 may be implemented on an architecture such as architecture 100, shown in FIG. 1. At step 510, a logical execution plan may be received by an optimizer. The logical execution plan may be received from a query parser, e.g., query parser 120, shown in FIG. 1, or any other device that is capable of transmitting a logical execution plan for a database query. The logical execution plan may contain a sequence of operators that may be executed to perform a database query (e.g., search the contents of the database, such as database 170 and/or 270). At step 520, the optimizer may receive an operator cost for each of the operators in the logical execution plan. The operator cost may be received from an OS kernel, e.g., OS kernel 140, shown in FIG. 1, or any other device that would have knowledge of the processing cost for operators used in querying a database. At step 530, the optimizer may compute an accumulated processing cost for a first table in the database. The accumulated processing cost may be computed based on the logical execution plan and the operator costs that correspond to the logical execution plan and the first table. At step 540, the optimizer may compute an accumulated processing cost for a second table in the database. The accumulated processing cost may be computed based on the logical execution plan and the operator costs that correspond to the logical execution plan and the second table. At step 550, the optimizer may compare the accumulated processing cost of the first table with the accumulated processing cost of the second table to determine which table has a highest accumulated processing cost. At step 560, in response to the comparison of step 550, the optimizer may compute a physical execution plan for the table with the highest accumulated processing cost that requires partitioning the table into a plurality of pieces.

Figure 6:
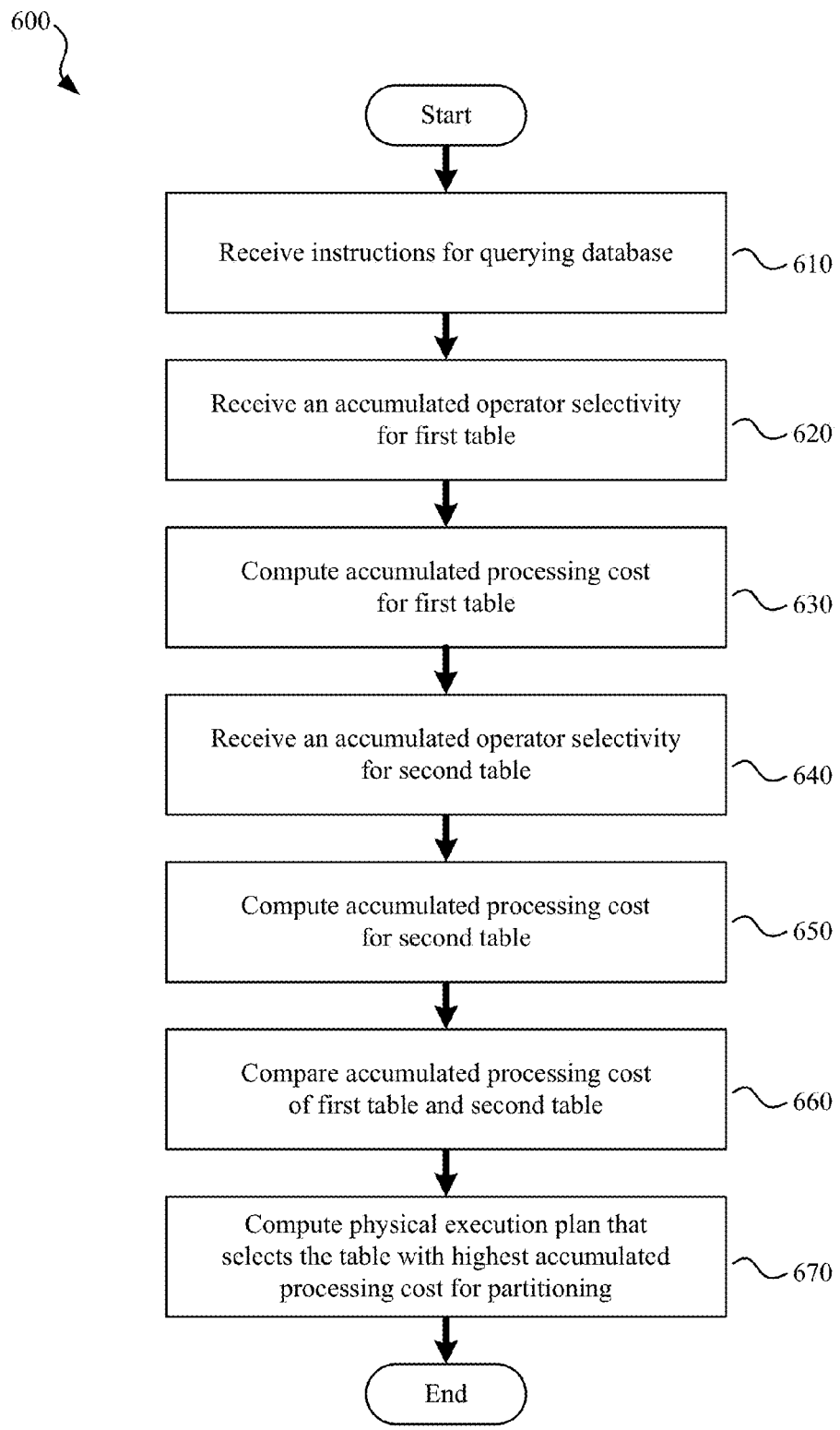
FIG. 6 is a flowchart of another embodiment of a method for cost-based piece-partitioning in a database.

FIG. 6 is a flowchart of another embodiment of a method 600 for cost-based piece-partitioning in a database. Method 600 may be implemented on an architecture such as architecture 100 by a CBPP optimizer, such as CBPP optimizer 130 and/or CBPP optimizer module 260. At step 610, instructions for querying a database, e.g., database 170 and/or 270, shown in FIG. 1, may be received by an optimizer, e.g., CBPP optimizer 130, shown in FIG. 1. The instructions for querying the database may be received from a query parser, e.g., query parser 120, shown in FIG. 1, or any other device that is capable of transmitting instructions for querying the database. At step 620, the optimizer may receive an accumulated operator selectivity related to a first table in the database. The operator selectivity may be received from a data statistics device, e.g., data statistics 150 shown in FIG. 1, or from any other device that is capable of determining statistics of a database and transmitting them to the optimizer. At step 630, the optimizer may compute an accumulated processing cost for a first table in the database. The accumulated processing cost may be computed based on the instructions for querying the database and the operator selectivity related to the first table in the database. At step 640, the optimizer may receive an accumulated operator selectivity related to a second table in the database. The operator selectivity may be received from a data statistics device, e.g., data statistics 150 shown in FIG. 1, or from any other device that is capable of determining statistics of a database and transmitting them to the optimizer. At step 650, the optimizer may compute an accumulated processing cost for a first table in the database. The accumulated processing cost may be computed based on the instructions for querying the database and the operator selectivity related to the second table in the database. At step 660, the optimizer may compare the accumulated processing cost of the first table with the accumulated processing cost of the second table to determine which table has a highest accumulated processing cost. At step 670 the optimizer, in response to the comparison of step 660, may compute a physical execution plan that selects the table with the highest accumulated processing cost for partitioning into a plurality of pieces.

Figure 7:
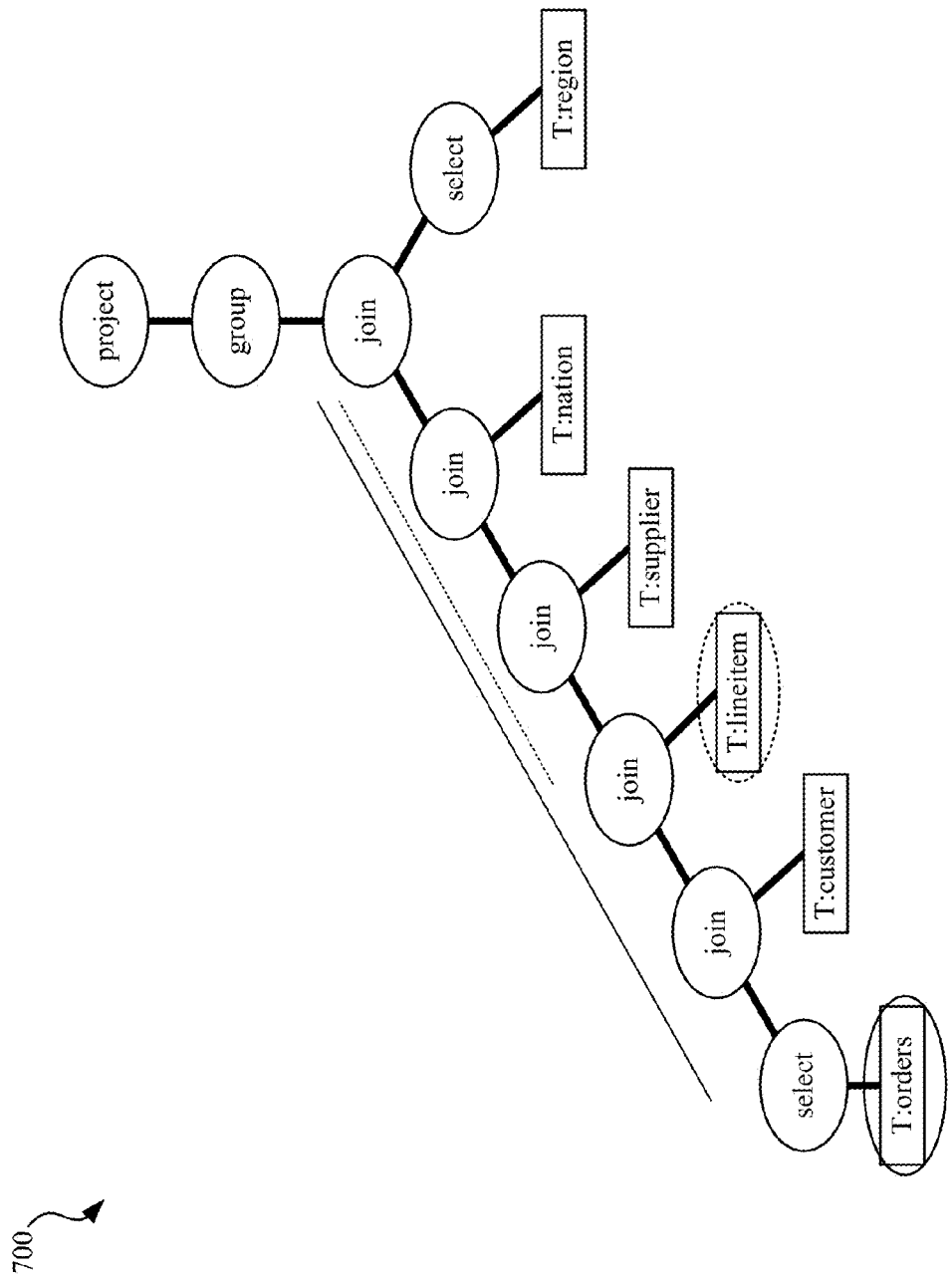
FIG. 7 is a schematic view of an embodiment of a partitioning plan for a database query.

FIG. 7 is a schematic view of an embodiment of a partitioning plan 700 for a database query. Plan 700 may be implemented on an architecture such as architecture 100 shown in FIG. 1, by a CBPP optimizer, such as CBPP optimizer 130 and/or CBPP optimizer module 260 to perform a method such as method 500 and/or 600 on a table from a database, such as database 170 and/or 270. In plan 700, a table with a highest accumulated processing cost may be selected. A path to the table with the highest accumulated processing cost and the table with the highest accumulated processing cost are indicated by a solid line in FIG. 7. The table with the highest accumulated processing cost may be, but is not necessarily, a table that is the largest in size (e.g., has a largest number of rows in a column oriented database). In plan 700, a path to the table with the largest size and the table with the largest size are indicated by a dotted line, and varies from the table with the highest accumulated processing cost. Accordingly, the method 500 and/or 600 may partition the table with the highest accumulated processing cost rather that the table that is the largest in size.

Figure 8:
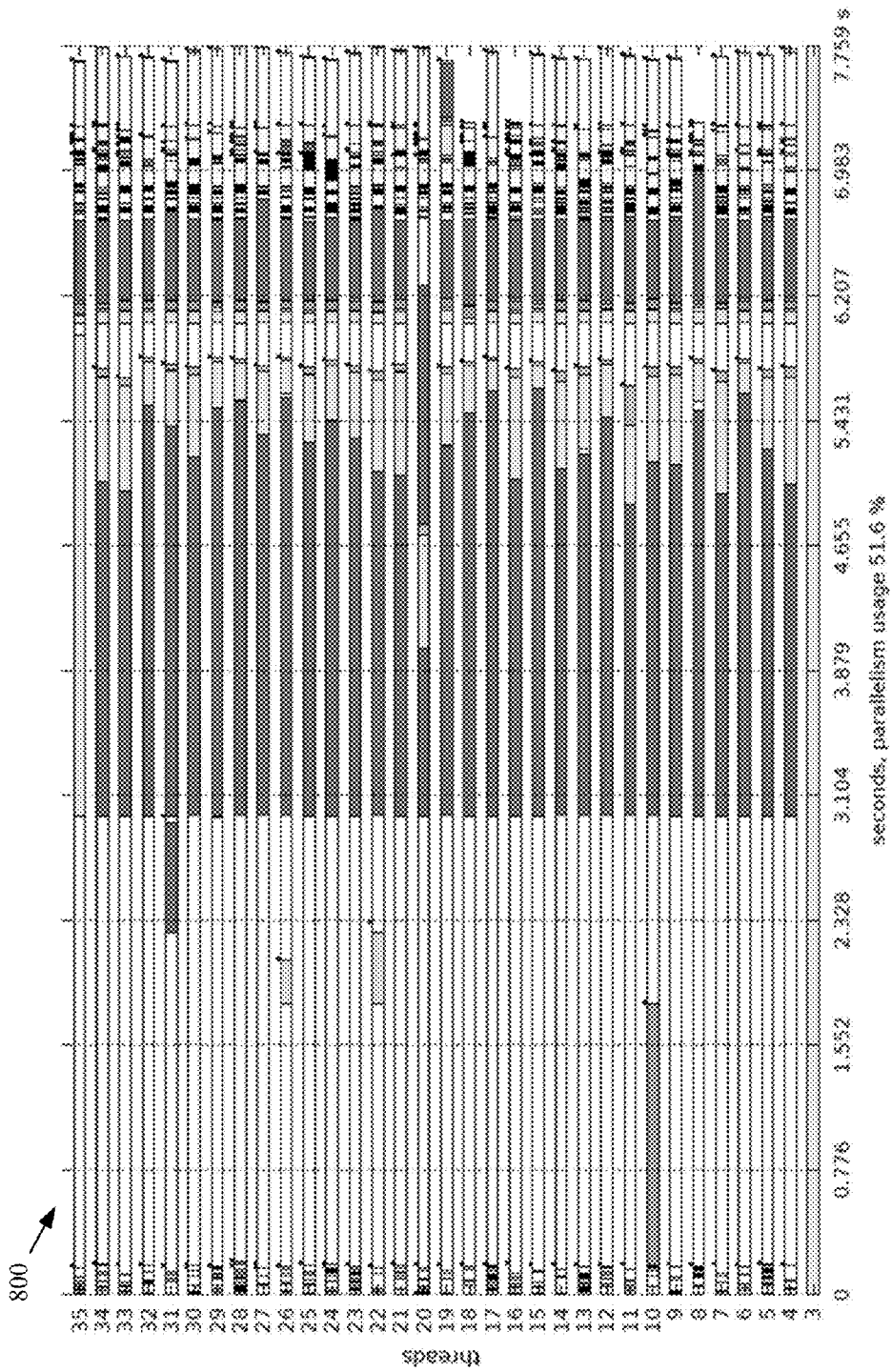
FIG. 8 is a graph of an embodiment of query execution time and CPU resource parallelism for a database query.

FIG. 8 is a graph 800 of an embodiment of query execution time and CPU resource parallelism for a database query (e.g. TPC-II Query five (Q5)). Graph 800 depicts results of a database query being run on an about 100 gigabyte (GB) test database without utilizing a CBPP optimizer or methods according to the present disclosure. In graph 800 it can be seen that the CPU performing the database query operated with about 51.6 percent (%) parallelism and completed the query in about 7.759 seconds.

Figure 9:
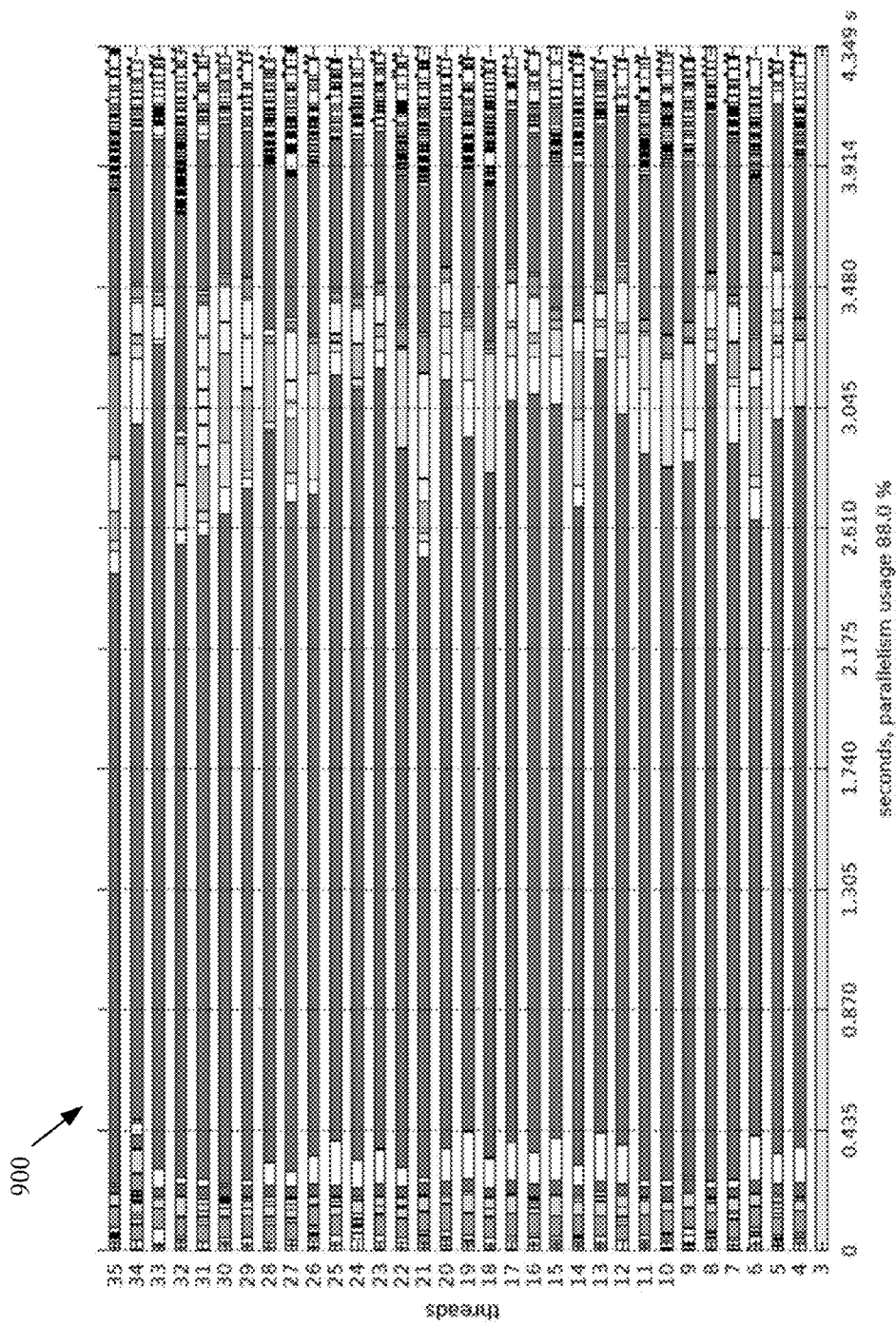
FIG. 9 is a graph of another embodiment of query execution time and CPU resource parallelism for a database query.

FIG. 9 is a graph 900 of another embodiment of query execution time and CPU resource parallelism for a database query (e.g. TPC-H Q5). Graph 900 depicts results of a database query being run on an about 100 GB test database utilizing a CBPP optimizer (e.g., CBPP optimizer 130, shown in FIG. 1) and/or methods (e.g., method 500, shown in FIG. 5, and/or method 600, shown in FIG. 6) according to the present disclosure. In graph 900 it can be seen that the CPU performing the database query operated with about 88% parallelism and completed the query in about 4.349 seconds.

Figure 10:
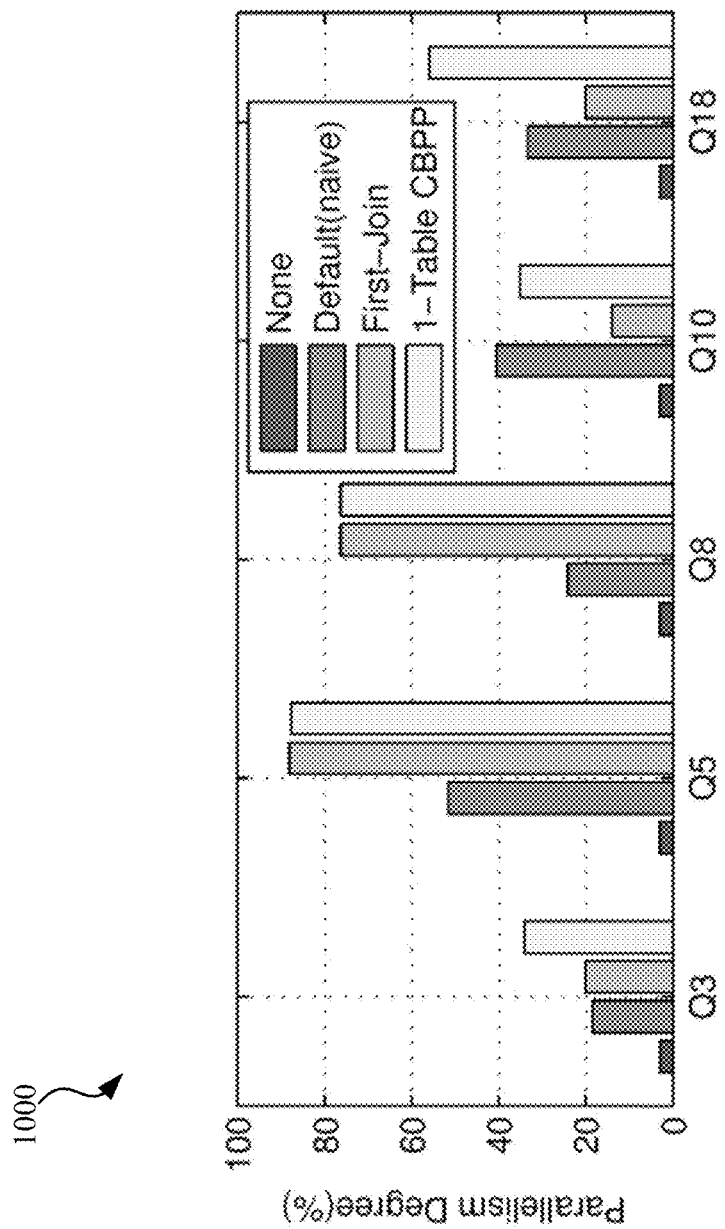
FIG. 10 is a graph of an embodiment of experimental data.

FIG. 10 is a graph 1000 of an embodiment of experimental data showing statistics of CPU processor parallelism usage. In graph 1000 it may be seen that optimizing a table in a database according to a cost-based piece partitioning plan (e.g., a plan according to method 500 and/or method 600 which may be implemented in an architecture 100) prior to performing operations on the database may increase parallelism in a CPU when compared to performing operations on the database when the table has not been optimized according to a cost-based piece partitioning plan. Graph 1000 includes results of CPU parallelism for database queries performed according to various embodiments of the present disclosure (e.g., CBPP and/or CBPP optimization) alongside CPU parallelism for queries performed according to other optimization methods (e.g., no optimization, default or naive optimization, and first-join optimization). In graph 1000, the horizontal axis indicates a particular query of the plurality of queries performed, and the vertical axis represents CPU parallelism degree (%). As shown in graph 1000, CPU parallelism for CBPP optimization, as discussed herein, is greater than or similar to CPU parallelism of other optimization methods for all queries tested. The results may be obtained using a Tomograph tool of MonetDB and performing 22 database queries of a TPC-H database run against a 100 GB scale. To obtain the results of graph 1000, a computer (such as, for example, network element 200) running Ubuntu Linux 3.5.0-17-generic x86 64 on 2 INTEL® XENON® E5-2680 CPUs operating at 2.70 Gigahertz (GHz) with 32 effective cores operating at 1.2 GHz, a 20480 kilobyte (KB) cache, 188 GB of RAM, and a TPC-H scale factor of 100 may be used.

Figure 11:
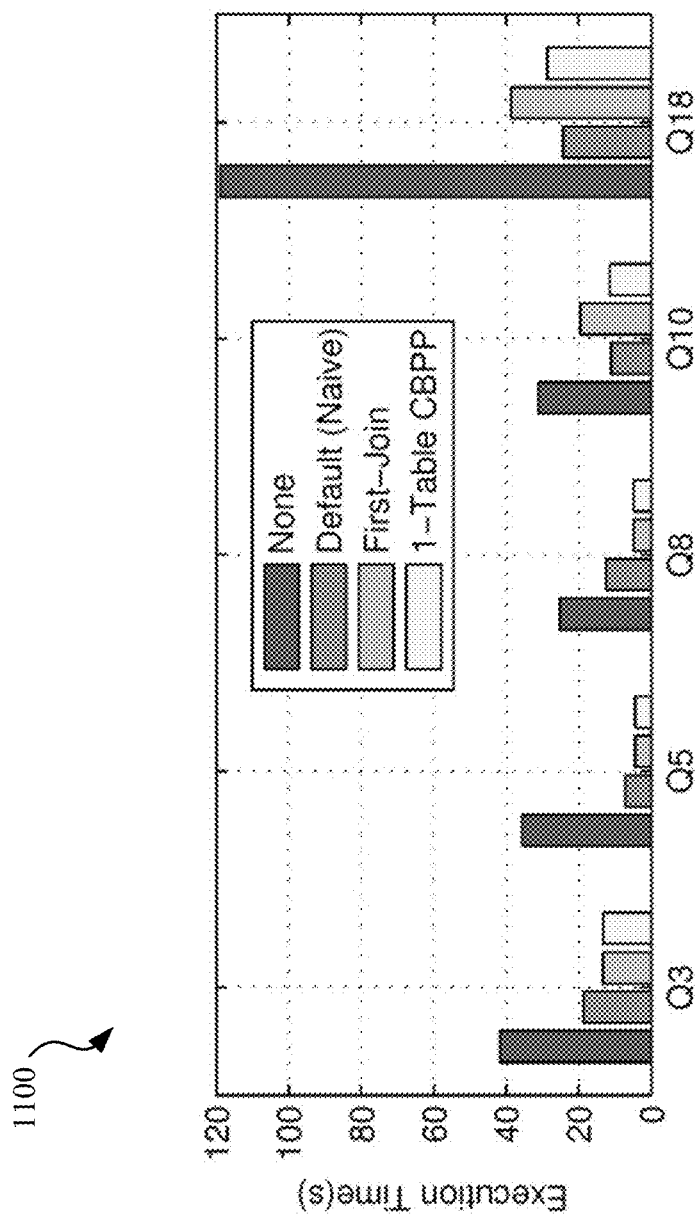
FIG. 11 is a graph of an embodiment of additional experimental.

FIG. 11 is a graph 1100 of an embodiment of additional experimental. Graph 1100 includes results of query execution time for database queries performed according to various embodiments of the present disclosure (e.g., CBPP and/or CBPP optimization) alongside query execution time for queries performed according to other optimization methods (e.g., no optimization, default or naive optimization, and first-join optimization). In graph 1100, the horizontal axis indicates a particular query of the plurality of queries performed, and the vertical axis represents query execution time in seconds (s). Results for graph 1100 may be obtained in a manner identical to that of graph 1000, shown in FIG. 10. As can be seen by graph 1100, execution time for CBPP optimization, as discussed herein, may be less than or similar to execution time of other optimization methods for all queries tested. Accordingly, execution time may be decreased through the use of CBPP optimization according to embodiments of the present disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow the scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
receiving a logical execution plan for a database query corresponding to a plurality of tables of a database, wherein the logical execution plan comprises one or more operators;
receiving an operator cost for each of the operators in the logical execution plan;
computing a first accumulated processing cost for a first of the tables based on the logical execution plan and operator costs corresponding to the first table;
computing a second accumulated processing cost for a second of the tables based on the logical execution plan and operator costs corresponding to the second table;
comparing the first accumulated processing cost and the second accumulated processing cost to determine a table with a highest accumulated processing cost; and
responsive to comparing the accumulated processing costs, computing a physical execution plan that requires partitioning the table with the highest accumulated processing cost.

2. The method of claim 1, further comprising partitioning the table with the highest accumulated processing cost into a plurality of pieces.

3. The method of claim 2, wherein the table with the highest accumulated processing cost is partitioned into a number of pieces equal to a number of available symmetric computing resources.

4. The method of claim 3, further comprising partitioning the table with less than the highest accumulated processing cost into fewer pieces than the number of pieces into which the table with the highest accumulated processing cost is partitioned.

5. The method of claim 3, wherein partitioning is performed according to a cost-based piece-partitioning scheme for determining an accumulated processing cost for each table.

6. The method of claim 5, wherein the cost-based piece-partitioning scheme comprises a product of a number of records stored in the table multiplied by a sum of the operator costs corresponding with the table and multiplied by an accumulated effective selectivity value corresponding to the table.

7. The method of claim 1, wherein the operator cost comprises an amount of computing resources required to perform a database table operation associated with the operator.

8. The method of claim 1, wherein the physical execution plan describes a plan for performing operations of the database query in parallel.

9. A method comprising:
receiving instructions for querying data in a database comprising a plurality of tables;
receiving an accumulated operator selectivity related to a first table by execution of the instructions;
computing a first accumulated processing cost for the first table based on the operator selectivity of the first table;
receiving an accumulated operator selectivity related to a second table by execution of the instructions;
computing a second accumulated processing cost for the second table based on the operator selectivity of the second table;
comparing the first accumulated processing cost and the second accumulated processing cost; and
selecting a table for partitioning in response to the comparison such that the table selected for partitioning has a highest accumulated processing cost.

10. The method of claim 9, further comprising partitioning the table with the highest accumulated processing cost into a plurality of pieces.

11. The method of claim 10, wherein the table with the highest accumulated processing cost is partitioned into a number of pieces equal to a number of available symmetric computing resources.

12. The method of claim 9, further comprising asymmetrically partitioning the table with less than the highest accumulated processing cost into a plurality of pieces according to a cost differential between tables.

13. The method of claim 11, further comprising determining physical instructions for querying the database, wherein the instructions indicate operations to be performed in parallel on the plurality of pieces of the table with the highest accumulated processing cost.

14. The method of claim 9, wherein the instructions contain a first operator and a second operator, and wherein the accumulated operator selectivity comprises a probability of a record being found in the first or second table of the database by the first operator prior to execution of the second operator.

15. The method of claim 9, wherein the accumulated processing cost for the first or second table comprises a product of a number of records stored in the table multiplied by a sum of the operator costs corresponding with the table and multiplied by the accumulated operator selectivity corresponding to the table.

16. An apparatus comprising:
a port configured to receive:
a query tree associated with a query to be performed on a plurality of database tables by a plurality of threads;
a number of records stored in each table;
a plurality of operator costs, each corresponding to an operator identified by the query tree and one of the tables; and
a plurality of accumulated effective selectivity values, each corresponding to one of the operators identified by the query tree and one of the tables; and
a processor coupled to the port and configured to:
compute an accumulated processing cost for each table comprising a product of a number of records stored in the table multiplied by a sum of the operator costs corresponding with the table and multiplied by the accumulated effective selectivity value corresponding to the table; and
compute a query execution plan for the query in response to a comparison that comprises instructions for partitioning one of the database tables with a highest accumulated processing cost.

17. The apparatus of claim 16, wherein the query tree contains a first operator and a second operator, and wherein the accumulated operator selectivity comprises a probability of a record being found in one of the table of the database by the first operator prior to execution of the second operator.

18. The apparatus of claim 16, wherein computing the query execution plan further comprises partitioning the table with the highest accumulated processing cost into a number of pieces determined by a number of symmetric computing resources available in the apparatus.

19. The apparatus of claim 18, wherein computing the query execution plan comprises partitioning a second table having an accumulated processing cost that is less than the highest accumulated processing cost into fewer pieces than the number of pieces into which the table with the highest accumulated processing cost in partitioned.

20. The apparatus of claim 16, wherein computing the query execution plan further comprises determining a sequence of operators for execution in parallel to perform the query on the database.

* * * * *